United States Patent [19]

Moery et al.

[11] 4,183,690

[45] Jan. 15, 1980

[54] APPARATUS FOR COUPLING A ROTATABLE CONTROL DEVICE TO A STATIONARY SWITCH

[75] Inventors: Richard B. Moery; Wayne J. Roberson, both of Asheville, N.C.

[73] Assignee: Farm Equipment Company, Inc., Asheville, N.C.

[21] Appl. No.: 1,383

[22] Filed: Jan. 8, 1979

[51] Int. Cl.² ........................ F16C 11/00; F16G 11/12

[52] U.S. Cl. ........................................ 403/59; 74/491; 74/501 R

[58] Field of Search ......... 403/59; 200/153 H, 153 R; 74/491 R, 501 R; 251/229, 232

[56] References Cited

U.S. PATENT DOCUMENTS

| | | | |
|---|---|---|---|
| 2,637,332 | 5/1953 | Langworthy | 251/229 X |
| 3,284,062 | 11/1966 | Obermeyer | 251/229 X |
| 3,813,959 | 6/1974 | Singer | 74/491 |
| 3,943,791 | 3/1976 | Casey | 74/491 X |

*Primary Examiner*—Wayne L. Shedd
*Attorney, Agent, or Firm*—David M. Carter

[57] ABSTRACT

An apparatus is provided for coupling a control device, which is adapted to rotate, to a stationary switch which is adapted to energize and control a machine. The coupling is made through a rotatable swivel which connects a freely rotatable table to a stationary support. The control device is mounted on the table and the switch is mounted on the stationary support. A ring is coupled to the control means and moves up and down in response to the control means. The ring is further coupled to the table and freely swivels and turns with the table. A U-shaped bracket is connected to the switch means and alternately contacts both the upper and lower surfaces of the ring as the ring moves up and down. The stationary switch means is thus switched from the first position to a second position providing a mechanism to control the machine from a rotating table without control hoses or cables becoming tangled and twisted.

11 Claims, 4 Drawing Figures

APPARATUS FOR COUPLING A ROTATABLE CONTROL DEVICE TO A STATIONARY SWITCH

BACKGROUND OF THE INVENTION

This invention relates to an apparatus for coupling a rotating control means to a stationary switch means. More particularly, it relates to a means for mechanically passing information to a switch through a rotating swivel for controlling a machine.

As the lumber business has become more and more mechanized, various machines have been introduced for efficiently sawing and loading lumber. One such machine is a hydraulic loader which is normally mounted on the back of a truck. The hydraulic loader picks up saw logs to be sawed into shorter sections, as well as stacks them onto a waiting truck or a stockpile. A source of hydraulic pressure to operate this loader is normally also mounted on the truck. The operator of the loader sits on a table which is mounted on top of a swivel. The grapples are also mounted on the table which is adapted to rotate freely, even through rotations greater than 360° if desired. The operator on the table utilizes various hydraulic controls for controlling the grapple and other devices. High pressure hoses are utilized to transfer the hydraulic control signals as well as the hydraulic power to the devices to be operated. However, since the swivel is adapted to turn through angles even greater than 360°, it is impossible to run high pressure hoses directly to the operator's hydraulic valve switches and out to the grapple because these hoses would become twisted and eventually rupture. Therefore, manufacturers of these loaders utilize complex hydraulic oil portals through the swivel coupling whereby the oil under pressure from the source on the truck is fed to the swivel and coupled through these portals to other pressure hoses leading from the swivel through the operator's switches on the rotating table and then to the grapple. An example of this hose through swivel to hose coupling is shown in FIG. 2. Swivel 5 couples hoses 50 to hoses 51 through internal portals (not shown). One such hydraulic loader is the Prentice 150 hydraulic loader manufactured by the Hydraulic Materials Division of Omar Industries and distributed through various distributors, such as Farm Equipment Company of Asheville, N.C., assignee of the present invention.

If a logger wished to add any additional equipment to be controlled by the operator who sits in the rotating table, he could not easily do so using this type of loader because the number of portals are fixed in the swivel corresponding to the number of hydraulic cylinders to be driven on the loader.

One such piece of additional equipment that is quite often used by lumber operators is a power saw such as the Hydro-Saw Buck manufactured by Forest Equipment Manufacturing Company, a subsidiary of Farm Equipment Company of Asheville, N.C., assignee of the present invention. As shown in FIG. 1, this saw is normally positioned adjacent to the loader so that the operator may insert logs into the bed of the saw by the grapple. The Hydro-Saw Buck utilizes hydraulic oil pressure to operate the saw. As more and more logging businesses are converting from hand saws to the use of this hydraulically operated saw, it has become apparent that there is a need for the loader-operator sitting on the rotating table to be able to control this saw from the table by himself. Again it would be impractical to run hydraulic hoses through the opening for the swivel and up to the operator controls because the line would twist and probably sever after several turns of the table. It is, of course, possible to redesign the swivel mechanism itself to add another hydraulic portal, however, this would require retooling and also would require a substantial change in the existing loaders. It is, therefore, desirable to easily and inexpensively retrofit the current loaders so that the operator on a rotating table may control additional equipment from his normal working position.

OBJECTS OF THE INVENTION

It is, therefore, one object of this invention to provide an apparatus for coupling a rotatable control means to a non-rotatable switch means.

It is another object to provide an improved log loader.

It is a further object to provide a rotatable log loader retrofitted for providing controls for equipment ancillary to the loader.

It is still another object of this invention to provide apparatus for inexpensively and easily retrofitting a swiveling table which is supported by a stationary support by adding additional controls for the operator on the table.

SUMMARY OF THE INVENTION

In accordance with one form of this invention, there is provided an apparatus for coupling a rotatable control means to a stationary switch. A table is provided and is adapted to freely rotate about an axis. The control means is mounted on the table which is supported by a stationary support coupled to the table through a swivel. A plate is coupled to the control means and is adapted to move in response to the control means. A bracket is connected to the stationary switch and drives the stationary switch means between a first position and a second position. The bracket is located in a sufficiently close proximity to the plate so as to engage the plate moving the switch between the first position and the second position in response to the control means.

BRIEF DESCRIPTION OF THE DRAWINGS

The subject matter which is regarded as the invention is set forth in the appended claims. The invention itself, however, together with further objects and advantages thereof, may be better understood by reference to the following description taken in conjunction with the accompanying drawings in which:

DESCRIPTION OF THE PREFERRED EMBODIMENT

Figure 1:
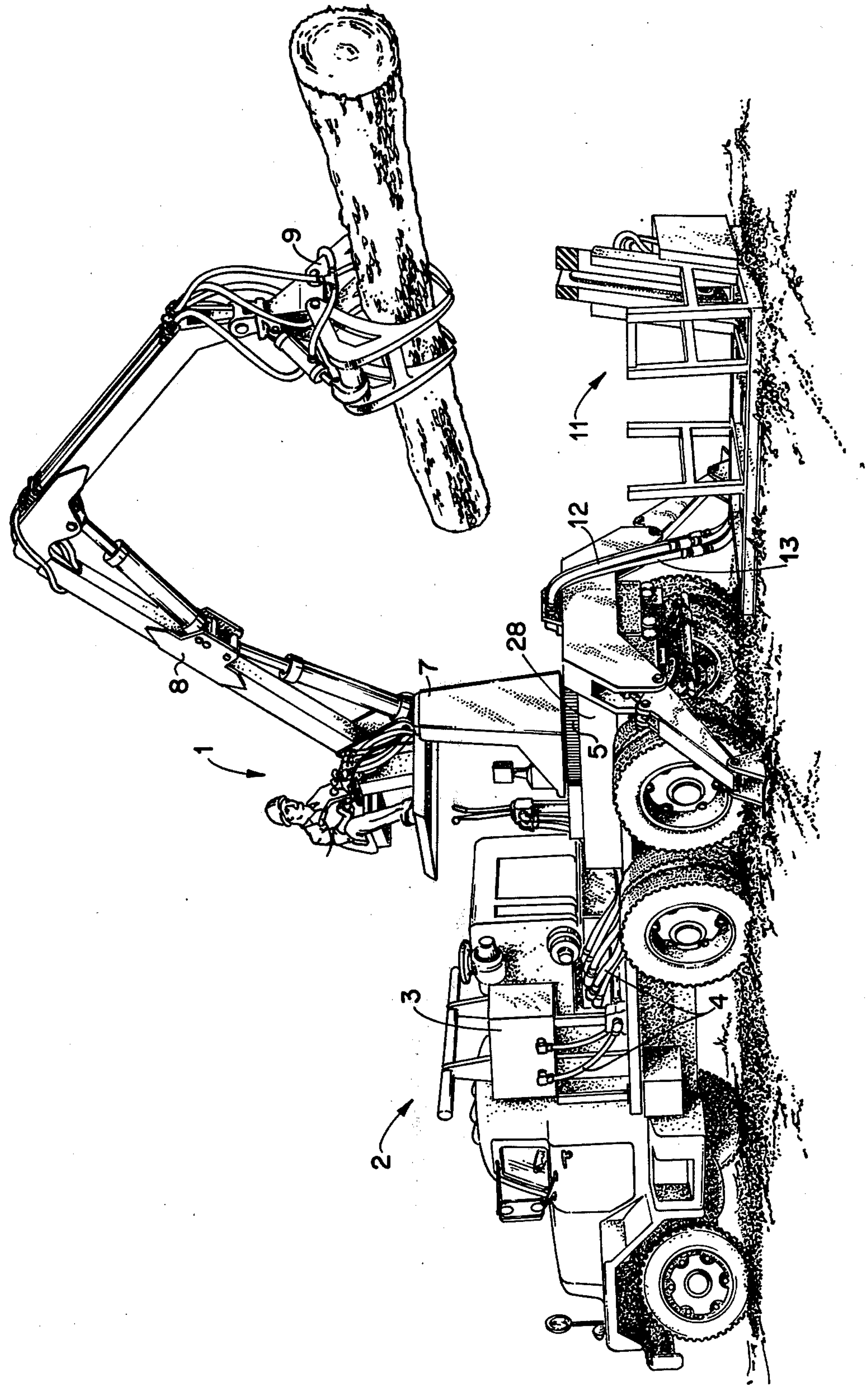
FIG. 1 is a pictorial representation of a log loader mounted to a truck and adapted to control a saw from the loader.
Figure 4:
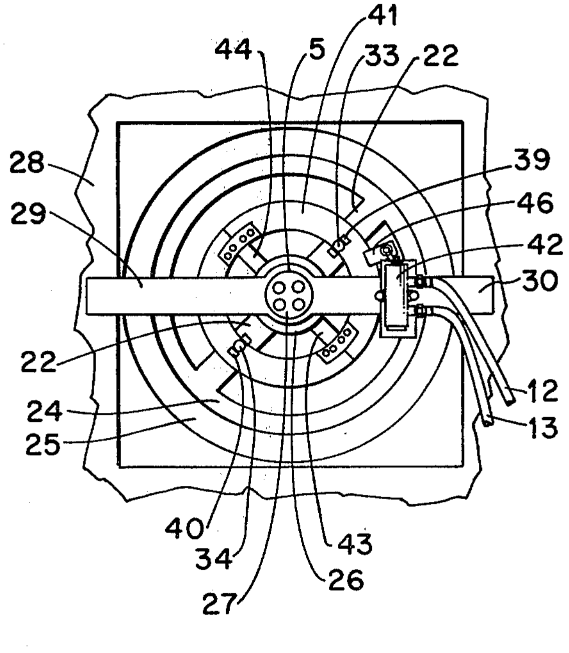
FIG. 4 is a bottom view of the apparatus of FIG. 2 mounted to the frame of the log loader of FIG. 1.

Referring now to FIG. 1, there is provided log loader 1 which is mounted on the back of the truck 2. A standard hydraulic oil pressure system 3 is also mounted on the back of truck 2. A plurality of hoses 4 are coupled from the oil pressure system to a swivel which is generally indicated by 5 in FIG. 1 and is shown in somewhat detail in FIGS. 2 and 4. For simplicity's sake, all of the various hoses are not shown. The hyraulic oil is fed through the swivel through internal portals (not shown) to the operator controls 6, as preveiously described. An operator is stationed on table 7, which freely rotates about its axis on swivel 5. The hydraulically movable arm 8 of the loader is also mounted on table 7 and freely rotates with the table. Grapple 9 is adapted to pick up logs 10 and either load them or stack them or, more importantly, place them into hydraulic saw 11 for cutting into desired lengths. As stated previously, the hydraulic saw may be the Hydro-Saw Buck. The loader may be the Prentice 150 Loader, having four oil portals through the swivel for operating the four hydraulic mechanisms on the loader. Thus, the loader 1 might not have an additional oil portal to operate saw 11 from the operator's table 7. However, as can be seen, hydraulic oil lines 12 and 13 extend from the automatic saw 11 to the stationary platform 28 of the loader. Controlling the automatic saw from the rotating table 7 without the additional portal will be explained in more detail in reference to FIG. 2.

Figure 2:
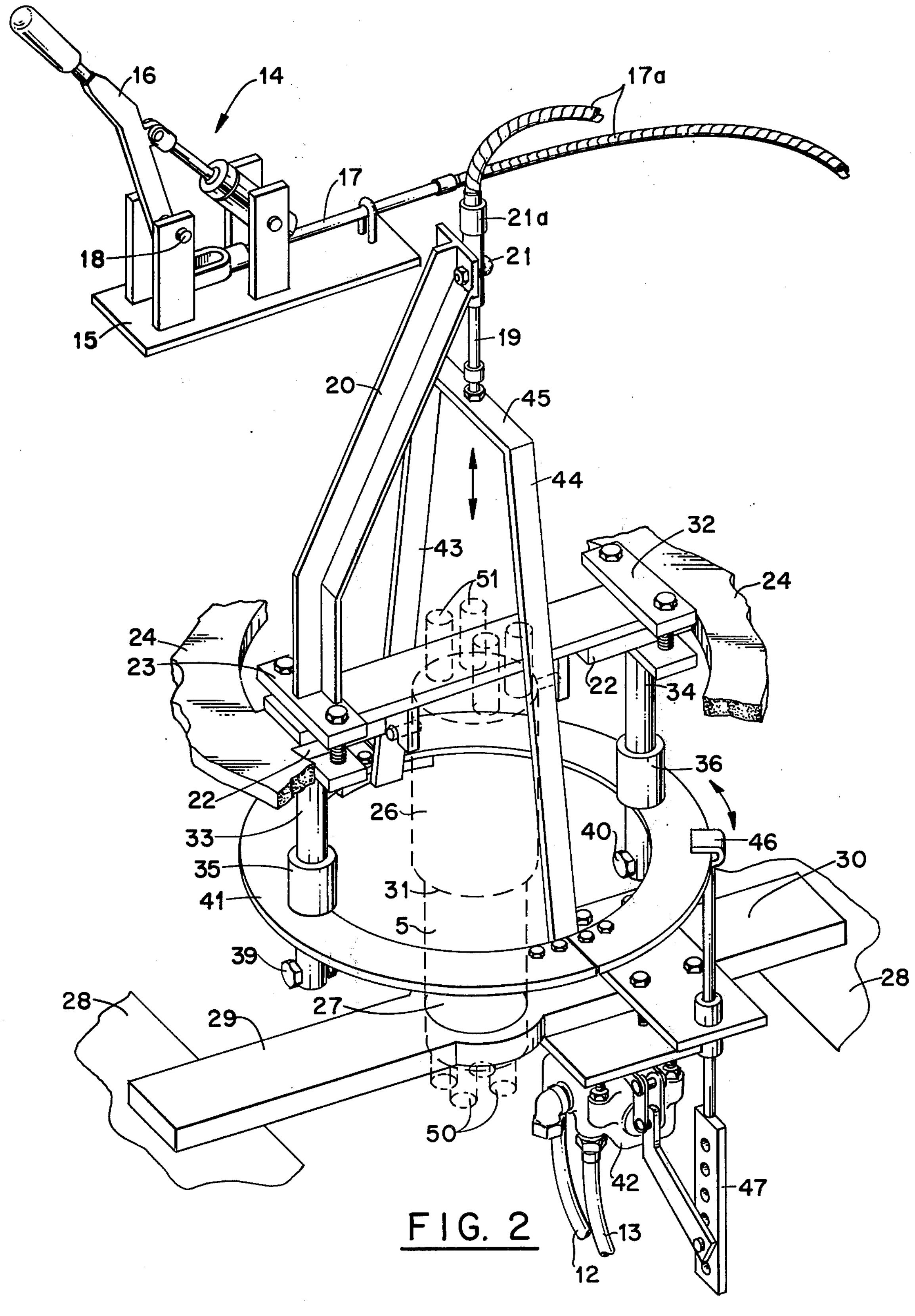
FIG. 2 is an isometric view of the apparatus according to one embodiment of the invention coupled to a swivel, which is shown in dotted outline.

FIG. 2 shows the coupling mechanism pursuant to the subject invention. Control means 14 is mounted on a surface 15 of table 7. The control means includes handle 16, which is coupled to one end of a steel cable 17. Cable 17 runs through conduit 17(*a*). As handle 16 is pivoted by the operator about pivot 18, cable 17 is moved either forward or rearward, and in the case of the lower portion 19 of the cable, upward or downward. The lower part of the cable 19 is constrained by bracket 20. The cable passes through U-bracket 21 which is mounted to bracket 20. U-bracket 21 is clamped to conduit end fitting 21(*a*). This bracket 20 enables the cable to move up and down without waving about.

The other end of bracket 20 is connected to bracket 22 by coupler clamp 23. Bracket 22 is further mounted to a portion 24 of rotatable table 7. Portion 24 of rotatable table 7 is in slidable contact with portion 25 of the stationary platform 28 forming the bed of the truck 2. This may be better seen in reference to FIG. 4. Referring to both FIGS. 2 and 4, rotary swivel 5 is a device for driving the table and is directed into rotating section 26 and stationary section 27. Stationary section 27 is coupled to platform 28 through brackets 29 and 30. The swivel 5, rotates about fitting 31, which divides the top and bottom portion of the swivel. Split ring 41, which is part of the coupling device between control means 14 and hydraulic switch 42, is connected to and moved by control cable 19 through brackets 43 and 44 and 45. Bracket 45 is bolted to the lower end 19 of the cable. Thus, as cable 19 moves up and down through the movement of the control arm 16, ring 41 also moves up and down. Of course, ring 41 rotates with rotatable table 7 since it is clamped to the table frame 22 by clamps 23 and 32. Guide pins 33 and 34 are respectively connected to clamps 23 and 32 and through semi-circular openings (not shown) in ring 41 through upper sleeves 35 and 36 and lower sleeves 37 and 38. Stop pins 39 and 40 penetrate through the lower ends of the guide pins. These guide pins permit the ring 41 to move up and down while being clamped to the table frame.

Ring 41 is permitted to rotate freely through U-bracket 46. However, U-bracket 46 is in close enough proximity to top and bottom sides of ring 41 that it may be readily slidably engaged by ring 41 upon the movement of control arm 16. U-bracket 46 is connected to hydraulic switch 42 through a levered rod assembly 47. Thus, as the ring goes up, the U-bracket 46 follows it up causing switch 42 to go to one position and when the ring 41 goes down, the U-bracket is down causing switch 42 to go to the other position. Hydraulic oil in lines 12 and 13 are thus controlled through switch 42 and thus, the control of the saw 11 is provided from the rotating table of the loader through the above-described coupling.

Figure 3:
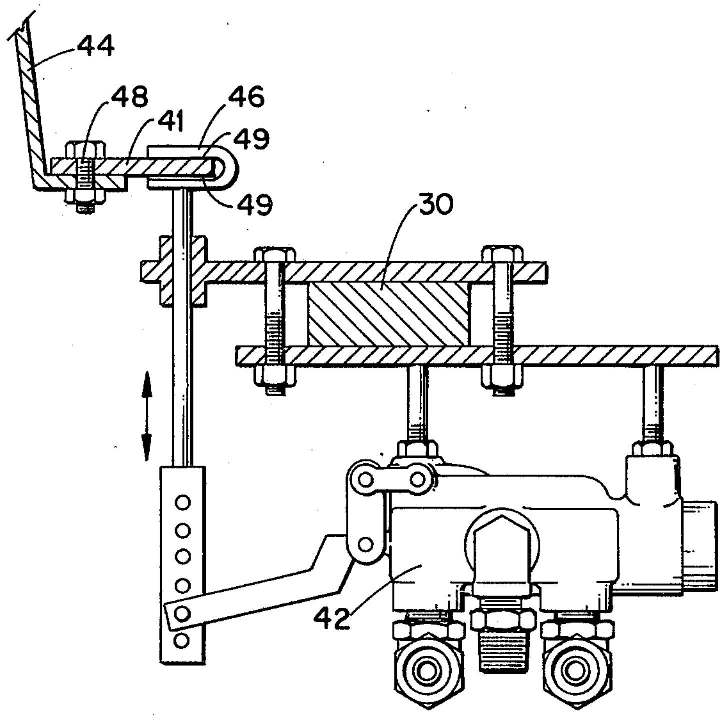
FIG. 3 is a partial cross-sectional elevational view showing more details of the U-shaped coupling mechanism and switch shown in FIG. 2.

As can be seen from FIG. 3, the bracket 44, as well as corresponding bracket 43, is mounted on the lower inside portion 48 of ring 41. U-bracket 42, however, is adapted to engage the ring on both the upper and lower outside portions 49 of ring 41. Thus, as the ring rotates, the motion of the support brackets 43 and 44 will not interfere with the engagement of U-bracket 46 to the ring. Furthermore, pins 33 and 34 do not interfere with U-bracket 46 since they also make contact with the ring 41 on its inside portion 48. Hydraulic switch 42 is connected to the stationary platform and bottom portion 27 of swivel 5 by providing-clamp 50 secured to frame 30. As stated previously the bottom 27 of the swivel is stationary and thus the switch 42 is also stationary.

All of the parts used in applicant's above-described invention are known machined metal parts which one skilled in the art may readily purchase on the open market.

From the foregoing description of one embodiment of the invention, it will be apparent many modifications may be made therein. It will be understood, therefore, that this embodiment of the invention is intended as an exemplification of the invention only, and that the invention is not limited thereto. For example, this invention has applicability through most any swivel coupling device where it is desired to provide control between a rotating table on one side of the swivel and a stationary place on the other side of the swivel, and thus has applicability in other areas besides the logging and loader business, as, for example, in the railroad business. It is to be understood, therefore, that it is intended in the appended claims to cover all modifications as fall within the true spirit and scope of the invention.

We claim:

1. An apparatus for coupling a rotatable control means to a stationary switch comprising:

a table adapted to freely rotate about an axis;

said control means connected to said table;

a stationary support coupled to said table through a swivel;

said table supported by said stationary support;

a plate coupled to said control means and adapted to move in response to said control means;

a bracket connected to said stationary switch means;

said bracket connected to said stationary switch means to drive said stationary switch means between a first position and a second position;

said bracket located in a sufficiently close proximity with said plate so as to engage said plate in response to said control means, thus moving said switch between said first position and said second position in response to said control means.

2. An apparatus as set forth in claim 1 wherein said plate is a ring.

3. An apparatus as set forth in claim 2 wherein said ring is coupled to said control means through a movable cable.

4. An apparatus as set forth in claim 2 wherein said ring is coupled to said cable by at least one bracket mounted on one portion of said ring.

5. An apparatus as set forth in claim 4 wherein said bracket makes contact with said ring on the opposite portion to said arms.

6. An apparatus as set forth in claim 2 wherein said bracket includes a U-shaped end portion in at least near contact with both sides of said ring, said ring adapted to rotate freely within said U-shaped bracket.

7. An apparatus as set forth in claim 5 wherein said bracket is adapted to make contact with said ring on the outer side of said ring and said arms are adapted to be mounted on the inside of said ring whereby said bracket and said arms will not interfere with one another during rotation of said ring.

8. An apparatus as set forth in claim 3 wherein said ring is slidably mounted to said table through at least one guide pin.

9. An apparatus as set forth in claim 1 wherein said switch is a hydraulic switch.

10. In an apparatus, including a rotatable table and a stationary support for said table, said table coupled to said support through a swivel, the improvement comprising:

control means adapted to be attached to said table;
a cable coupled to said control means and to a bracket means;
a ring;
said bracket means coupled to one portion of said ring;
a U-shaped member adapted to engage another portion of the ring removed from said bracket coupling for engaging the ring;
said U-shaped member further coupled to a switch means;
said switch means adapted to be mounted to the stationary support means;
said switch means controlling a machine whereby when said control means is placed in one position, said ring is moved into a first position, and engaging said U-shaped member on one side of said ring for switching said switch means into one position and when said control means is placed in a second position said ring engaging said U-shaped member on another side of said ring causing said switch means to switch to a second position, whereby controls are provided to a machine from a moving table through a swivel.

11. An apparatus as set forth in claim 10 wherein said machine is a power saw.

* * * * *